E. G. JOHANSON.
GLASS MOLDING APPARATUS.
APPLICATION FILED DEC. 5, 1917.
1,261,939.
Patented Apr. 9, 1918.
2 SHEETS—SHEET 2.
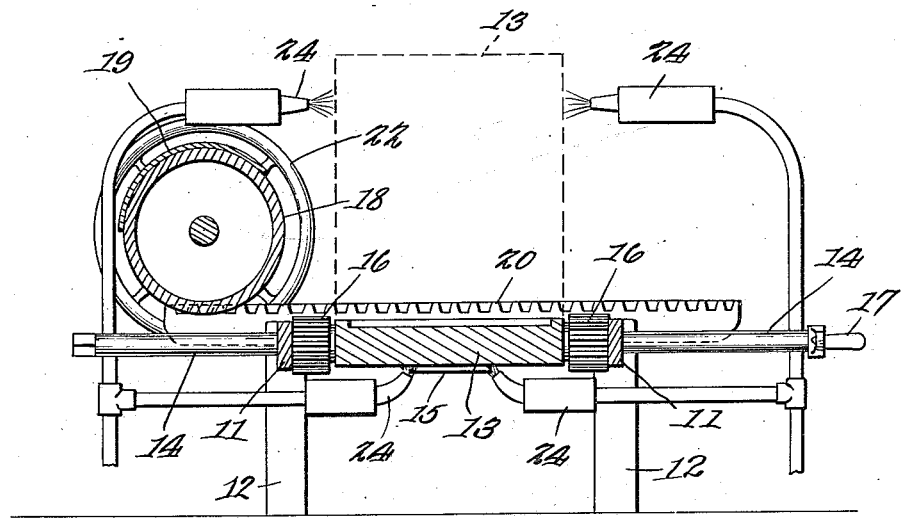
Fig. 3.
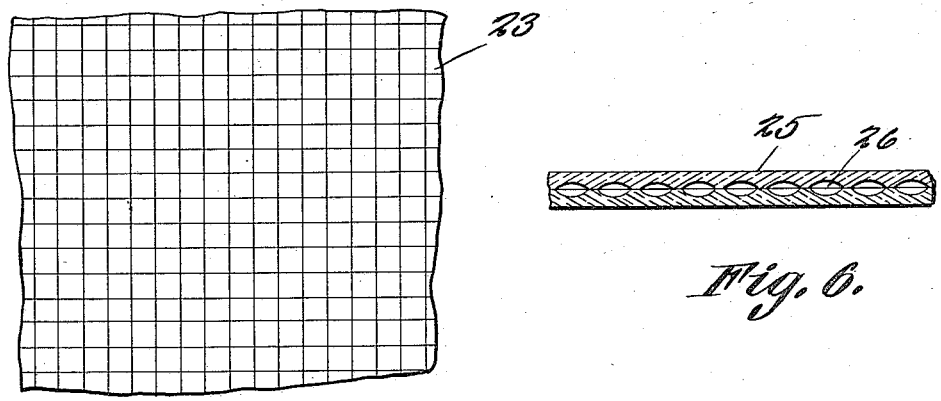
Fig. 4.
Fig. 6.
Fig. 5.
Inventor
Emil G. Johanson
By 
Attorneys

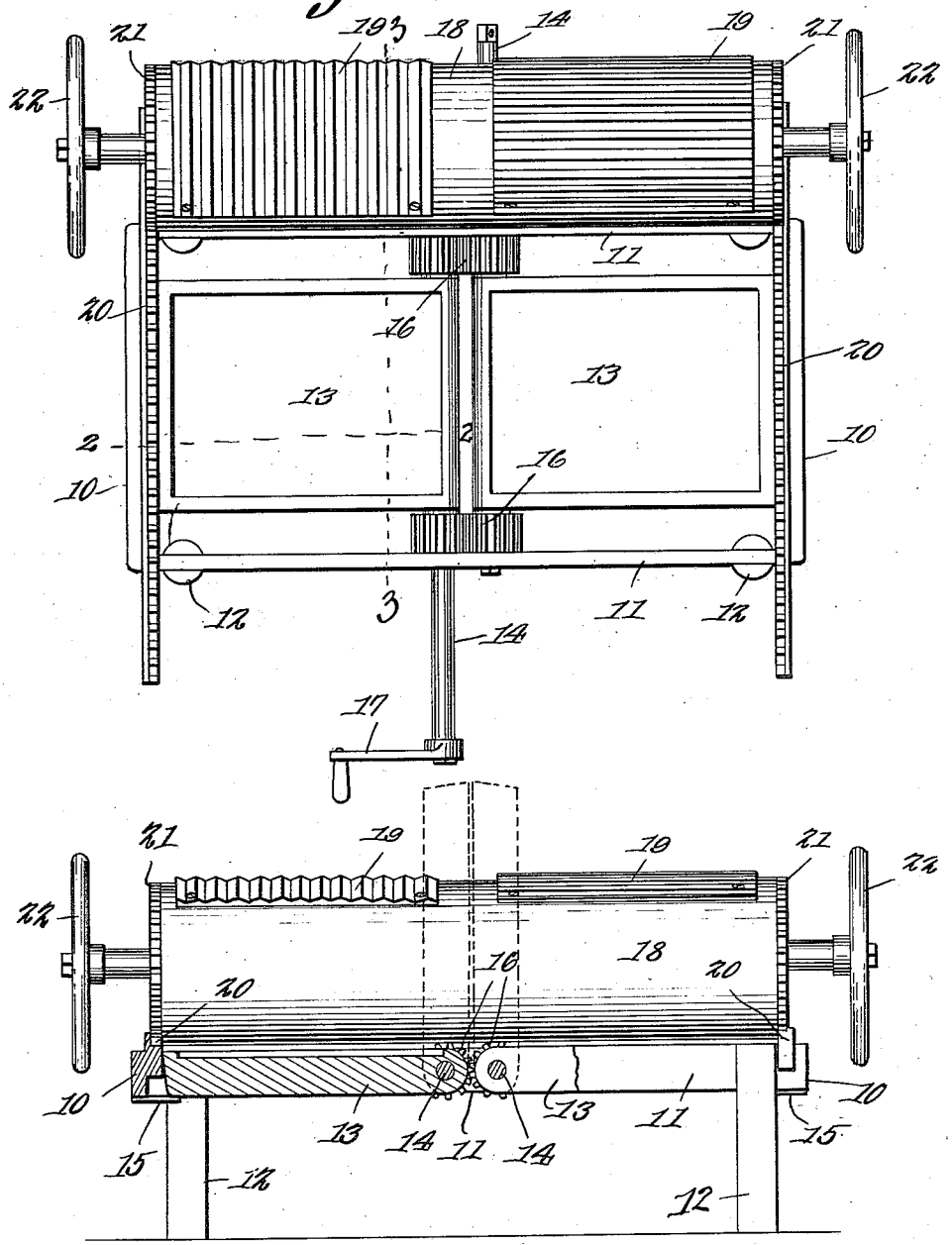

UNITED STATES PATENT OFFICE.

EMIL G. JOHANSON, OF CHICAGO, ILLINOIS.

GLASS-MOLDING APPARATUS.

1,261,939.  Specification of Letters Patent.  Patented Apr. 9, 1918.

Application filed December 5, 1917. Serial No. 205,530.

*To all whom it may concern:*

Be it known that I, EMIL G. JOHANSON, a subject of the King of Sweden, residing at Chicago, in the county of Cook and State of Illinois, have invented new and useful Improvements in Glass-Molding Apparatus, of which the following is a specification.

This invention relates to apparatus for uniting glass sheets while in a soft or plastic condition, and its object is to provide in an apparatus of this kind a means for impressing on one side of the sheets a surface design, these designs being on the sides of the sheets which come together, so that when the sheets are united there is produced a single sheet having an interior design which produces a composite optical effect. The double glass can be used for office partitions, windows, doors, etc., where a ground or carved glass effect is desired, and as the outer surface of the glass is smooth, the cleaning of both sides is simplified.

The invention also has for its object to provide a simple and efficient means for supporting the glass sheets while the design is being applied, said means being so mounted that they can be swung to bring the two sheets together to effect their union.

A further object of the invention is to so arrange the impression means and the sheet uniting means, that the two operations are easily and quickly effected.

Other objects and advantages of the invention will be pointed out in the detailed description appearing hereinafter, and in order that the invention may be better understood, reference is had to the accompanying drawings forming a part of this specification.

In the drawings,

Figure 1 is a plan view of the apparatus;

Fig. 2 is an end view thereof, partly in section, on the line 2—2 of Fig. 1;

Fig. 3 is a longitudinal section on the line 3—3 of Fig. 1;

Fig. 4 is a plan view of the article produced by the apparatus;

Fig. 5 is a cross section of such article, and

Fig. 6 is a cross section of the article having a different design.

Referring specifically to the drawings, the bed of the apparatus is an open frame composed of parallel, spaced side rails 10 and end rails 11 connecting the same, said frame being mounted on suitable legs 12. This frame supports holders for the two glass sheets which are to be operated on. Each of these holders or supports comprises a bed plate 13 having a top depression in which the glass sheet is adapted to seat. One end of the plate 13 is made fast to a rock shaft 14 extending between the end rails 11 and journaled in bearing apertures therein. It will therefore be seen that the bedplates 13 are pivotally supported so that they may be swung in a vertical plane from normal horizontal position in the same plane, to upstanding position facing each other. Both bedplates are supported in this manner, and when they are in horizontal position, their free ends rest on shelves 15 extending inwardly from the side rails 10. The rock shafts 14 of the two bedplates 13 are geared together by means of pinions 16, so that both plates swing together when either rock shaft is operated. The rock shafts extend from the end rails and have their outer ends squared for the application of a hand crank or other device 17 for turning the same.

At 18 is shown a roller carrying plates 19 inscribed with the design to be impressed on the glass sheets. This roller is mounted to roll along the side rails 10, its length being such that it reaches across both bedplates 13. Along the side rails 10 are mounted racks 20, and on the ends of the roller are gears 21 meshing with said racks, whereby the roller is guided to travel in a straight line across the bedplates 13. The ends of the roller 18 are provided with hand wheels 22 for operating it.

The operation of the apparatus may be summarized as follows:

The sheets of glass (shown at 23), while in a soft or plastic state, are placed on the bedplates 13, the latter being down in horizontal position. The roller 18, positioned at one end of the apparatus, is now advanced across the glass sheets, whereupon the designs are impressed on the exposed top surfaces thereof. The roller is carried completely across the two sheets over to the end of the apparatus opposite the end from which it was started so that on the next operation it may be brought back to the first-mentioned end. After the roller impresses the glass sheets and clears the same, one of the rock shafts 14 is operated to swing the bedplates 13 to erect position, as shown dotted in Fig. 2 which brings the impressed surfaces of the two glass plates together, and as the glass is in a plastic state, the two surfaces will adhere when a slight pressure is applied. If the glass sheets are not sufficiently plastic to adhere as they come together, they may be positively united by directing the flames from hydrogen torches 24 on the joint at the sides and bottom, which acts to weld the surfaces together and holds the two plates united until properly framed for installation. After the torches have done their work, the bedplates 13 are separated by being swung down back to horizontal position, and the double glass sheet is then removed. The bedplates are now ready for the next two glass plates to be united.

Various designs may be impressed on the glass sheets. Figs. 4 and 5 show a design consisting of parallel ridges, the ridges of one sheet being arranged at a right angle to the ridges of the other sheet. Fig. 6 shows a glass unit 25 in which the meeting faces of the two sheets are provided with depressions 26. The plates 19 are detachably connected to the roller 8 so that other plates, provided with different designs, may be applied to the roller.

The preferred embodiment of the invention has been shown, but it will be understood that various changes and modifications may be made without a departure from the spirit and scope of the invention as claimed hereinafter.

I claim:—

1. In an apparatus of the character described, a pair of bedplates normally positioned horizontally in the same plane, means for swinging said plates to come into erect face-to-face position, and a design impression roller mounted for travel across the bed plates when in horizontal position.

2. In an apparatus of the character described, a pair of bedplates normally positioned horizontally in the same plane, and pivotally supported to swing into erect face-to-face position, and a design impression roller mounted for travel across the bedplates when in horizontal position.

3. In an apparatus of the character described, a pair of bedplates normally positioned horizontally in the same plane, rock shafts to which said plates are connected, means for operating the rock shafts to swing the plates into face-to-face position, and a design impression roller mounted for travel across the bedplates when in horizontal position.

4. In an apparatus of the character described, a pair of bedplates pivotally supported to swing into erect position and facing each other, and means for directing a welding heat to the edges of the plates when in erect position.

In testimony whereof I affix my signature.

EMIL G. JOHANSON.